June 23, 1936.  A. NOYES, JR  2,044,807
TRANSDUCER
Filed June 30, 1933  2 Sheets-Sheet 1

Inventor
Atherton Noyes, Jr.
by David Rines
Attorney

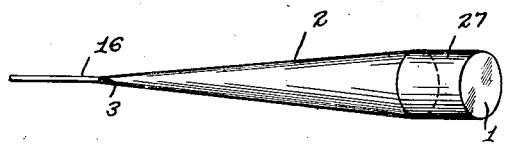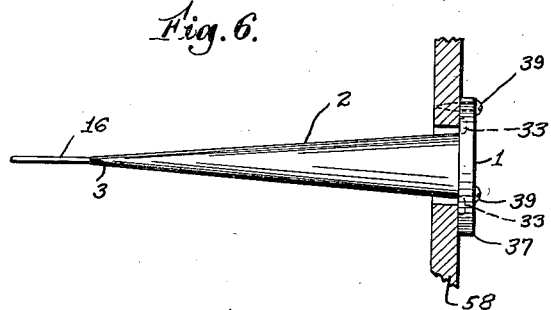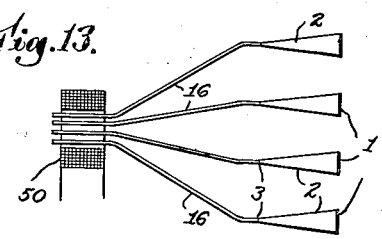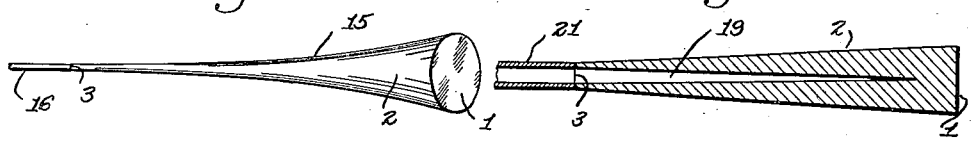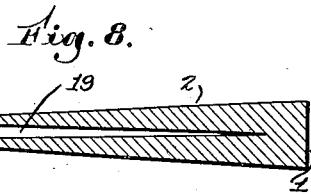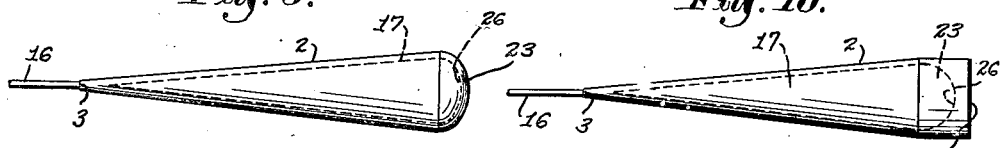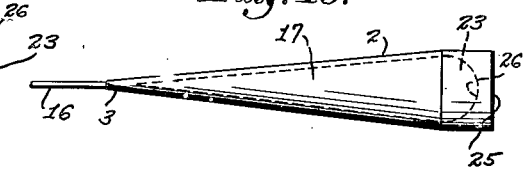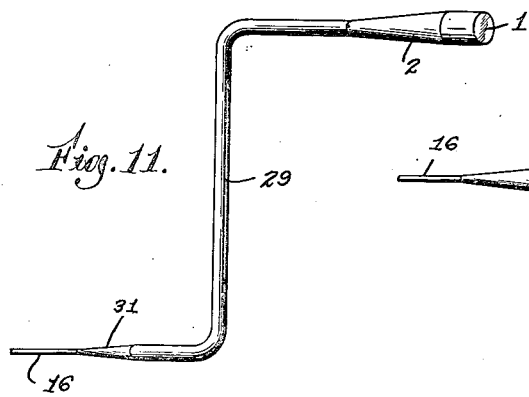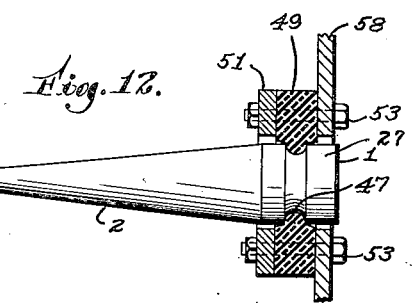

Patented June 23, 1936

2,044,807

UNITED STATES PATENT OFFICE 2,044,807

TRANSDUCER

Atherton Noyes, Jr., Winchester, Mass., assignor to George W. Pierce, Cambridge, Mass.

Application June 30, 1933, Serial No. 678,481

7 Claims. (Cl. 177—386)

The present invention relates to vibratory systems and apparatus, and more particularly to electrical systems and apparatus employing electromechanical vibrators. From a more limited aspect, the invention relates to the transmission and reception of intelligence, using sound waves as the agency of communication, and to methods of and means for directively discriminating a sound beam. The term "sound" will be employed hereinafter, in the specification and the claims, to include the supersonic, as well as the audible, part of the sound spectrum, and to include also all kinds of elastic vibrations. The invention, indeed, finds particular application to supersonic communication.

An object of the invention is to provide a new and improved vibrator, particularly of the magnetostrictive type.

Another object is to provide a new and improved transducer of sound, particularly for use in a system for directively discriminating a sound beam.

According to the invention disclosed in a copending application, Serial No. 591,838, filed February 9, 1932, by George W. Pierce, high-frequency, acoustic vibrations are received by a diaphragm at one end of a length of wire and the mechanical vibrations thus produced in the wire are transmitted along the wire, with the velocity of sound in the metal, to the other end or some other point of the wire, where they are converted into electrical energy, which may be put to any desired use; or the vibrations may be excited electrically, mechanically or otherwise, at the said other end of the wire and transmitted along the wire to the diaphragm at the first-named end and radiated from the diaphragm out into space, as through the water of the ocean.

Still another object of the invention is to improve upon the diaphragms disclosed in the said application.

Another object of the invention is to provide an inter-converter of sound and electric energy the sensitive characteristic of which is essentially independent of frequency over a wide range.

Other and further objects will be explained hereinafter, and will be particularly pointed out in the appended claims.

Figure 1:
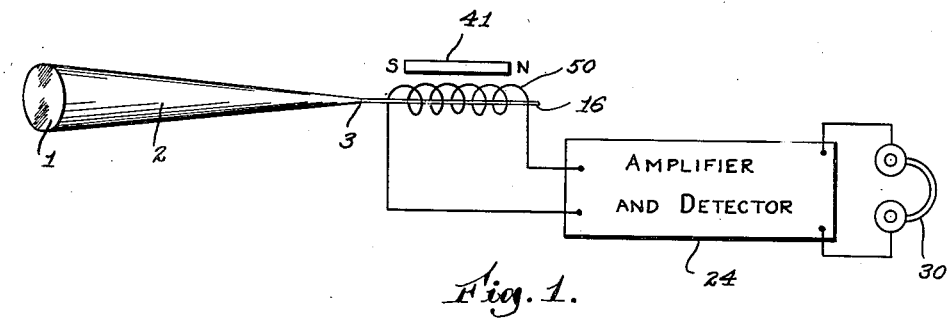
Figure 2:
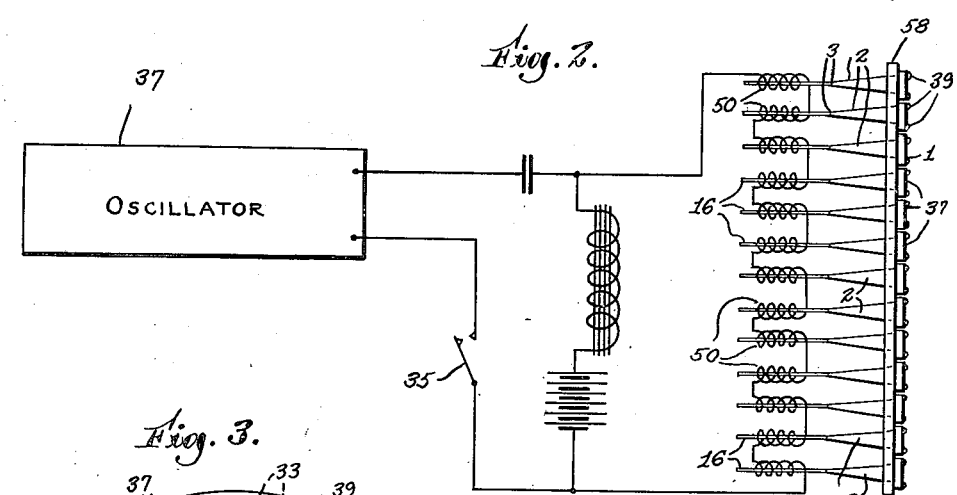
Figure 3:
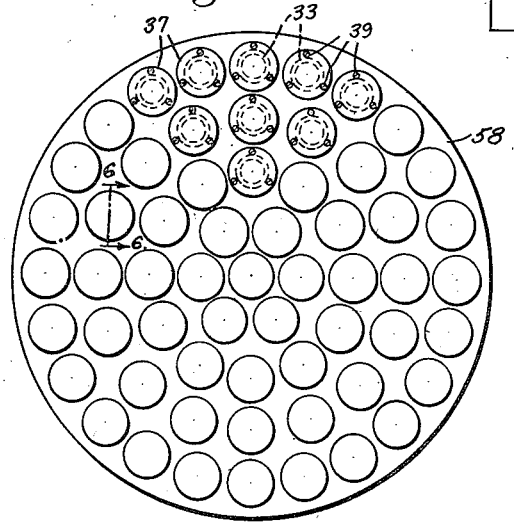
Figure 4:
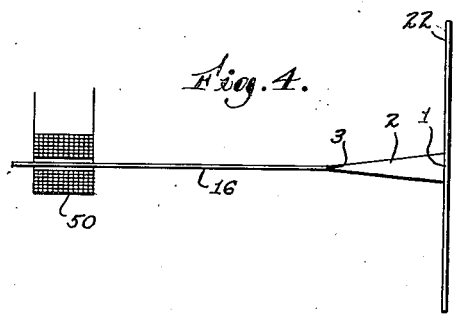

The invention will now be explained in connection with the accompanying drawings, in which Fig. 1 is a simplified, diagrammatic view of a receiving system illustrating, in perspective, one form that the novel sonic transducer of the present invention may assume; Fig. 2 is a somewhat more complicated, diagrammatic view, upon a smaller scale, of apparatus and circuits for a transmitting installation employing a large number of units constructed according to the invention, and mounted upon a single head; Fig. 3 is a side elevation of the head shown in Fig. 2, illustrating a feature of the invention; Figs. 4 and 5 are views of modifications; Fig. 6 is a section taken upon the line 6—6 of Fig. 3, looking in the direction of the arrows, but upon a larger scale; Figs. 7 to 11 are different-scale views of further modifications; Fig. 12 is a section similar to Fig. 6 of still another modification; and Fig. 13 is a view of a further modification.

The sound-transforming unit 2 of the present invention is in more or less conical form, of length and diameter varying according to the circumstances and the desired frequency range to be covered. It is adapted to be disposed with its base, or larger end face 1, in contact with a sound-conducting medium, such as the ocean, for the purpose of propagating therein, or receiving therefrom, sound waves, particularly of supersonic frequency. Acoustic energy is thus interchanged between the medium and the base 1 of the diaphragm.

The opposite, smaller end 3 of the transducer may be connected with a magnetostrictive core, shown as a rod or wire 16, or a tube 21, associated with a pick-up coil 50, or with any other desired device for obtaining electric current or voltage from the mechanical motion or pressure, or vice versa. If magnetostriction is employed, a polarizing magnet 41 may be used, or the polarizing magnetic field may be obtained by passing a direct current through the pick-up coil 50. The sides of the unit should be surrounded by some medium, such as air, having widely different mechanical properties from those of the material used in the construction of the transducer, to prevent loss of sound energy into this surrounding medium. The energy of the vibrations received by the large end 1 is thus transferred to the small end face 3, and along the core 16 or 21. Owing to the taper of the conical unit 2, the mechanical impedance between the medium at the face 1 and the magnetostriction element 16 or 21 is more evenly matched, and there is less chance of reflection from the small area 3.

The resulting voltages or currents developed in the coil 50 may be fed into an amplifier and detector 24, of any well known form, and through an audio amplifier (not shown) to a loud speaker, telephone or other indicating device 30, which may be replaced by a relay in the detector output. The amplifier 24 may be in two or more stages, preferably tuned to the same frequency as the frequency of the sound-beam signal, or to a desired component of the sound frequency.

As the operation is completely reversible, the invention is equally applicable to receiving, as illustrated in Fig. 1, and to transmitting, as illustrated in Fig. 2. A single-cone transducer may be employed, as in Fig. 1. It is preferable, however, if directive reception or radiation is desired, to employ a large number of tapered units, as in Figs. 2 and 3, all mounted upon a single support 58, and each connected with a magnetostrictive driving core. The cores are each provided with a coil 50, the coils being connected together in any desired manner, as in series, to an oscillator 37, which serves as a source of high-frequency oscillations of the desired frequency.

An additional advantage accruing from the fact that the units are tapered lies in the fact that it is now possible to pack the faces 1 of the units closely together in a compact array and still have space for the coils 50 around the magnetostrictive elements 16.

Alternatively, all the wires (of equal lengths) may be brought out together and surrounded by a single coil, as illustrated in Fig. 13, or affixed to a tube of magnetostrictive material surrounded by a coil.

The oscillator 37 may be controlled by a key 35. The vibrations may, however, be excited in any other desired way. In sending, it is particularly desirable to have a large number of transducers in an extended array whose dimensions are large in comparison with the wave length used, in order to radiate power essentially in a beam of sound. Whether receiving or sending, the transducers should be so arranged as to operate in phase if it is desired that sound be received or radiated along a line perpendicular to the array of cones.

The tapered transducer of the present invention may also be used to cooperate with some additional member, such as the auxiliary plate diaphragm 22 illustrated in Fig. 4, the transducer being disposed between the magnetostrictive core 16 and the plate 22.

Whether for sending or receiving, the tapered unit of the present invention may assume any of a large number of different forms. The cone need not necessarily be round in cross section, for it may be rectangular or of any other desired shape; and its large end may be plane, curved, or of any other surface. The transducer is, however, of more or less tapering form between the faces 1 and 3. The taper may be linear, as shown in Figs. 1 to 5 and 8 to 13, or exponential, as shown at 15, in Fig. 7. The cone may be solid, or it may be partly or wholly hollow, the better to match the impedance of the water. The hollow may conform to the tapering sides, as indicated at 17, Fig. 9, or it may taper inward, with the widest end of the hollow at the small end 3 of the cone, as illustrated at 19, Fig. 8.

In all these variations of the basic idea of the present invention, the object achieved is the matching of mechanical impedances between the magnetostrictive take-off element 16 or 21 and the portion of the medium in contact with the surface 1, at the same time retaining efficient interchange of acoustic and electric energy. This will be understood from the following considerations.

If one attempts to receive sound on one end face of a cylindrical bar of magnetostrictive material and take off electrical energy by surrounding some other portion of the bar by a coil, the transfer of acoustic to electrical energy will be inefficient. The reason for this is that, owing to the opposing electromotive forces due to eddy currents in the bar, the interior portions of the bar are not efficiently coupled magnetostrictively to the coil. In other words, the energy transfer between a rod and a coil is more efficient for small rods than for rods of greater diameter. However, the energy incident upon the end surface of such a bar is proportional to the area of the end surface. Consequently, if a cylindrical transducer is used, efficiency is lost either because the bar is too great in diameter to couple efficiently to the coil or because it is too small to collect much energy.

If one tries to get around this difficulty by collecting sound energy over a relatively large area, such as a circular diaphragm, and then attempts to take this energy from the diaphragm through the agency of a wire which will be efficient magnetostrictively, one finds little or no gain, due to the fact that most of the energy is reflected back from the junction of the diaphragm and the wire, and lost.

Thus, when an elastic wave, travelling in a bar, meets a point where the cross sectional area of the bar is suddenly reduced, a large portion of the energy in the wave is reflected backward and lost. If, however, the change in cross-sectional area can be effected gradually, as in the present invention, loss by reflection is reduced to a minimum. Similarly, if there is a sudden discontinuity in mass per unit of distance, as at the boundary between the water and surface 1 of a solid cone, considerable energy is lost by reflection. This effect can be reduced if the effective mass per unit length of the cone at this surface is reduced by hollowing the cone, as shown, for example, in Figs. 9 and 10.

A transducer of the form shown in Fig. 8 is particularly desirable when a tube 21 is used as the take-off element, for without the internal taper 19, there would be a sharp discontinuity at the junction of the tube 21 and the surface 3. The tube 21 is especially useful for transmission since it will dissipate more power than a wire or small rod, but it may equally well be used for reception.

When the hollow is shaped as illustrated at 17, Fig. 9, the inside face at the base of the cone may be arched, as illustrated at 26, to prevent possible bending of the base 26 by the compressional forces that may be exerted thereagainst. So long as the inside curve of the arched base 26 is preserved, however, for this purpose, the outer face may be of any desired shape. It is shown as flat, or straight, at 25 in Fig. 10 and round, at 23, in Fig. 9. The base of the diaphragm may be extended, as shown at 27 in Fig. 5, though the extension need not necessarily be cylindrical, as shown.

In some cases, it may be necessary to transmit the sound some distance, and perhaps around a curve, between the coil 50 and surface 1. If a wire 16 be pulled tight around a bend, considerable sound energy will be lost, through friction, against the support. It is, however, possible to transmit the sound vibrations around curves with very little loss by the method shown, for example, in Fig. 11. The diameter of the sound conductor is reduced by the coning shown at 2 from that of the surface 1 to any convenient diameter, as indicated at 29. The sound conductor then continues, without taper, in the form of a rod in which the desired bend or bends may be made and self-sustained. Finally, the taper is again continued, as shown at 31, to match the take-off element 16.

The transducer unit may be secured to the head 58 in many ways, two of which are illustrated. The base of the diaphragm may be provided integrally with a flange 37, separated therefrom by a web 33 of reduced width, bolts or nuts 39 being passed through the flange 37 into the head 58. The extension 27 may, however, be provided with a peripheral groove 47 into which some compressible material 49 may be forced, which compressible material 49 is held in place between the head 58 and a plate 51 by bolts 53.

A large number of such units, mounted with their faces 1 in a plane array, will have a directionally selective characteristic, the sharpness of which is determined by the dimensions of the array in comparison with the wave length of the sound in the medium. Thus, such an array can be used to determine the position of sources of submarine sounds (such as the revolving propeller of boats or submarines), through the agency of the high-frequency components of these sounds. Since such sound emitters differ considerably in the amounts of energy radiated at supersonic frequencies, it is very desirable that the receiving array be capable of responding well over a wide range of supersonic frequencies. The device which is the subject of the present invention, being largely non-resonant, is of particular advantage for this reason. Such units should, however, be designed with a length of taper greater than a half wave length of sound of the lowest frequency to be used. Tapers shorter than this show a marked falling off of sensitivity at the lower frequencies.

The relative sensitivity of the transducer of the present invention over non-tapered units of otherwise similar type but not of substantially conical form, is of about the order of 10 to 1.

It will be understood that the invention is not restricted to the illustrated embodiments thereof, but is susceptible to further modifications and change within the skill of the artisan, and all such modifications and changes are considered to fall within the spirit and scope of the invention as defined in the appended claims.

What is claimed is:

1. A substantially conical, hollow sound transducer provided with a hollow tapering inward from the small end of the cone, the hollow being widest at the small end of the cone.

2. A sound transducer comprising a rigid body of relatively large area at one end and tapering to a relatively smaller area at the other end and provided with an untapering, sound-conducting, extension, the extension being bendable but being adapted to retain its bent form, and the extension being provided with a tapering terminal.

3. Apparatus of the character described comprising a body the cross-sectional area of which tapers progressively from one end of the body to the opposite end thereof, the larger end of the body being disposed in contact with a sound-conducting medium to interchange energy between the medium and said larger end, whereby energy will be transferred between the said ends of the body, and the length of taper of the body being greater than the half-wavelength of the sound energy interchanged.

4. Apparatus of the character described comprising a solid body the cross-sectional area of which tapers progressively from one end of the body to the opposite end thereof, the larger end of the body being disposed in contact with a sound-conducting medium to interchange energy between the medium and said larger end, whereby energy will be transferred between the said ends of the body, and the length of taper of the body being greater than the half-wavelength of the sound energy interchanged.

5. Apparatus of the character described comprising a hollow body the cross-sectional area of which tapers progressively from one end of the body to the opposite end thereof, the larger end of the body being disposed in contact with a sound-conducting medium to interchange energy between the medium and said larger end, whereby energy will be transferred between the said ends of the body, and the length of taper of the body being greater than the half-wavelength of the sound energy interchanged.

6. Apparatus of the character described comprising a body the cross-sectional area of which varies progressively from one end of the body to the opposite end thereof, and a vibratory plate diaphragm affixed to the larger end of the body, the diaphragm being disposed in contact with a sound-conducting medium to interchange energy between the medium and said diaphragm, whereby energy will be transferred between the said ends of the body, and the length of taper of the body being greater than the half-wavelength of the sound energy interchanged.

7. Apparatus of the character described comprising a tapering rigid body the larger end of which is adapted to interchange sound energy with a sound-conducting medium, the external diameter of the tapering rigid body increasing progressively from its smaller end to its larger end, the interior of the tapering rigid body being hollow, and the cross-sectional area of the hollow decreasing progressively from its smaller end to its larger end.

ATHERTON NOYES, Jr.